(12) United States Patent
Joubert

(10) Patent No.: US 8,857,847 B2
(45) Date of Patent: Oct. 14, 2014

(54) INFANT STROLLER WITH ATHLETIC ACCESSORY CONTAINER

(76) Inventor: Jean-Pierre Joubert, Durham, NC (US)

( * ) Notice: Subject to any disclaimer, the term of this patent is extended or adjusted under 35 U.S.C. 154(b) by 3 days.

(21) Appl. No.: 13/525,399

(22) Filed: Jun. 18, 2012

(65) Prior Publication Data

US 2012/0319371 A1    Dec. 20, 2012

Related U.S. Application Data

(60) Provisional application No. 61/497,984, filed on Jun. 17, 2011.

(51) Int. Cl.
B62B 3/02 (2006.01)

(52) U.S. Cl.
USPC .................. 280/651; 280/642; 280/DIG. 6

(58) Field of Classification Search
USPC .................... 280/651, 642, DIG. 6
See application file for complete search history.

(56) References Cited

U.S. PATENT DOCUMENTS

| | | | | |
|---|---|---|---|---|
| 3,291,502 | A * | 12/1966 | England | 280/645 |
| 3,360,279 | A * | 12/1967 | Hunt | 280/35 |
| 4,493,492 | A * | 1/1985 | Balabanova | 280/651 |
| D297,525 | S * | 9/1988 | Baechler | D12/129 |
| 4,953,880 | A * | 9/1990 | Sudakoff et al. | 280/47.38 |
| 5,193,842 | A * | 3/1993 | Fontenot | 280/645 |
| 5,460,399 | A * | 10/1995 | Baechler et al. | 280/650 |
| 5,476,275 | A * | 12/1995 | Baechler et al. | 280/47.38 |
| 5,522,614 | A * | 6/1996 | Eyman et al. | 280/642 |
| 5,536,033 | A * | 7/1996 | Hinkston | 280/642 |
| 5,558,357 | A * | 9/1996 | Wang | 280/647 |
| 5,695,212 | A * | 12/1997 | Hinkston | 280/642 |
| 5,887,889 | A * | 3/1999 | Andrus | 280/647 |
| 5,934,757 | A * | 8/1999 | Smith | 297/452.13 |
| 6,000,712 | A * | 12/1999 | Wu | 280/639 |
| 6,036,220 | A * | 3/2000 | Zhen | 280/642 |
| 6,053,525 | A * | 4/2000 | Lin | 280/642 |
| 6,095,548 | A * | 8/2000 | Baechler | 280/650 |
| 6,099,020 | A * | 8/2000 | Liao | 280/643 |
| 6,120,053 | A * | 9/2000 | DeAngelis | 280/641 |
| 6,168,174 | B1 * | 1/2001 | MacDougall | 280/47.34 |
| 6,193,263 | B1 * | 2/2001 | Lin | 280/643 |
| 6,217,045 | B1 * | 4/2001 | Leyton | 280/79.7 |
| 6,299,195 | B1 * | 10/2001 | Chan | 280/651 |
| 6,325,406 | B1 * | 12/2001 | O'Shea et al. | 280/642 |
| 6,416,077 | B1 * | 7/2002 | Chen et al. | 280/642 |
| 6,533,309 | B2 * | 3/2003 | Lin | 280/642 |
| 6,722,689 | B2 * | 4/2004 | Kreamer | 280/642 |
| 6,749,214 | B2 * | 6/2004 | Shieh | 280/651 |
| 6,830,260 | B2 * | 12/2004 | Everett | 280/642 |
| 6,837,502 | B1 * | 1/2005 | Lee | 280/79.5 |
| 6,886,839 | B2 * | 5/2005 | Everett | 280/62 |

(Continued)

*Primary Examiner* — Jeffrey J Restifo

(74) *Attorney, Agent, or Firm* — Nifong, Kiefer, and Klinck PLLC

(57) ABSTRACT

An infant stroller is provided. The infant stroller includes a frame having a frontward-facing seat for receiving an infant and a first wheel assembly at a frontward portion thereof for transport of the stroller and a support of the frame at a rearward portion thereof. A pair of wheel assembles is carried about opposing positions of the rearward portion of the frame. A handle assembly is detachable from the frame and defines spaced-apart handle portions that are configured for interconnecting with spaced-apart frame members. An enclosure area is defined by a cross-member that spans the spaced-apart frame members and by the spaced-apart handle portions of the handle. An athletic article container is carried on the support and extends through the enclosure area.

15 Claims, 6 Drawing Sheets

(56) References Cited

U.S. PATENT DOCUMENTS

| | | | |
|---|---|---|---|
| 6,896,286 B2 * | 5/2005 | Lin | 280/650 |
| 6,938,300 B2 * | 9/2005 | Lan | 16/18 R |
| 6,991,248 B2 * | 1/2006 | Valdez et al. | 280/647 |
| 7,000,939 B2 * | 2/2006 | Shapiro | 280/646 |
| 7,229,091 B2 * | 6/2007 | Lan | 280/642 |
| 7,296,820 B2 * | 11/2007 | Valdez et al. | 280/647 |
| 7,311,323 B1 * | 12/2007 | Lan | 280/642 |
| 7,320,471 B2 * | 1/2008 | Maciejczyk | 280/47.38 |
| 7,364,182 B2 * | 4/2008 | Jane Santamaria | 280/642 |
| 7,410,185 B2 * | 8/2008 | Chen et al. | 280/642 |
| 7,527,283 B2 * | 5/2009 | Horacek | 280/642 |
| 7,543,840 B2 * | 6/2009 | Lin | 280/639 |
| 7,614,640 B2 * | 11/2009 | Dean et al. | 280/642 |
| 7,874,563 B2 * | 1/2011 | Mims | 280/47.38 |
| 7,971,897 B2 * | 7/2011 | Pike et al. | 280/650 |
| 8,006,992 B2 * | 8/2011 | Britton | 280/204 |
| 8,186,706 B2 * | 5/2012 | Dotsey | 280/647 |
| 8,226,111 B2 * | 7/2012 | Valdez et al. | 280/647 |
| 8,444,170 B2 * | 5/2013 | Chen et al. | 280/642 |
| 8,505,956 B2 * | 8/2013 | Hartenstine et al. | 280/642 |
| 8,534,698 B2 * | 9/2013 | Dotsey | 280/642 |

\* cited by examiner

INFANT STROLLER WITH ATHLETIC ACCESSORY CONTAINER

CROSS-REFERENCE TO RELATED APPLICATIONS

This application claims priority to U.S. Provisional Patent Application No. 61/497,984 filed on Jun. 17, 2011, the entire contents of which are hereby incorporated by reference.

TECHNICAL FIELD

The presently disclosed subject matter is directed towards an infant stroller, and more particularly, towards an infant stroller having a carrying enclosure for carrying an athletic article such as a golf club or bag for carrying a golf club.

BACKGROUND

Infant strollers are used to transport an infant, toddler, or young child. Strollers usually include a seat for seating the infant, toddler, or young child, a pair of wheeled assemblies configured for allowing wheeled movement of the stroller, a handle assembly for steering the stroller, and a frame interconnecting respective components.

Strollers may include various hooks or other attachment mechanisms for attaching a bag or other carrying device to the stroller. However, these bags or other carrying device are usually restricted in size as appropriate spacing is not provided for a specifically sized opening, or alternatively, the stroller is not properly sized such that the stroller may tip over or become unsteady if carrying a large bag or other carrying device.

Accordingly, there remains a need for a stroller that addresses the various disadvantages associated with conventional devices.

SUMMARY

According to one aspect of the disclosed subject matter, an infant stroller is provided. The infant stroller includes a frame having a frontward-facing seat for receiving an infant and a first wheel assembly at a frontward portion thereof for transport of the stroller and a support spanning opposing frame members of the frame at a rearward portion thereof. A pair of wheel assemblies is carried about opposing positions of the rearward portion of the frame. A handle assembly is detachable from the frame and defines spaced-apart handle portions that are configured for interconnecting with spaced-apart frame members. An enclosure is defined by a cross-member that spans the spaced-apart frame members and by the spaced-apart handle portions of the handle. An athletic article container is carried on the support and extends through the enclosure.

According to one aspect of the disclosed subject matter, the frontward portion of the frame defines a front pivot point to which the first wheel assembly pivots about such that the first wheel assembly is pivotable rearwardly.

According to one aspect of the disclosed subject matter, the frame defines a rear pivot point spaced frontwardly of the support such that the pair of wheel assemblies is pivotable frontwardly.

According to one aspect of the disclosed subject matter, the cross-member defines at least one u-shaped clip configured for receiving an elongate shaft of an athletic article.

According to one aspect of the disclosed subject matter, the stroller further includes a basket about the support for receiving an end of the elongate shaft.

According to one aspect of the disclosed subject matter, the stroller further includes a counterweight at the front portion of the frame for retarding rearward pivoting forces about the pair of wheel assemblies.

According to one aspect of the disclosed subject matter, the counterweight is a cooler.

According to one aspect of the disclosed subject matter, the frontward portion of the frame defines a front pivot point to which the first wheel assembly pivots about such that the first wheel assembly is pivotable rearwardly and the frame defines a rear pivot point spaced frontwardly of the support such that the pair of wheel assemblies is pivotable towards the frontwardly. The frame may be foldable between a folded position and an unfolded position.

According to one aspect of the disclosed subject matter, the athletic article is a golf club.

According to one aspect of the disclosed subject matter, an infant stroller is provided. The stroller includes a frame carrying a seat for receiving an infant and a first wheel assembly at a frontward portion of the frame for transport of the stroller. A support spans opposing frame members of the frame at a rearward portion thereof. A pair of wheel assembles is carried about opposing positions of the rearward portion of the frame. A handle assembly is detachable from the frame and defines spaced-apart handle portions that are configured for interconnecting with spaced-apart frame members. A cross-member spans the spaced-apart frame members and carries one or more golf club engaging members configured for engageably receiving an elongate shaft of a golf club. A basket assembly is carried about a rearward portion of the frame and configured for receiving an end of the golf club.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter now will be described more fully hereinafter with reference to the accompanying drawings, in which some, but not all embodiments are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
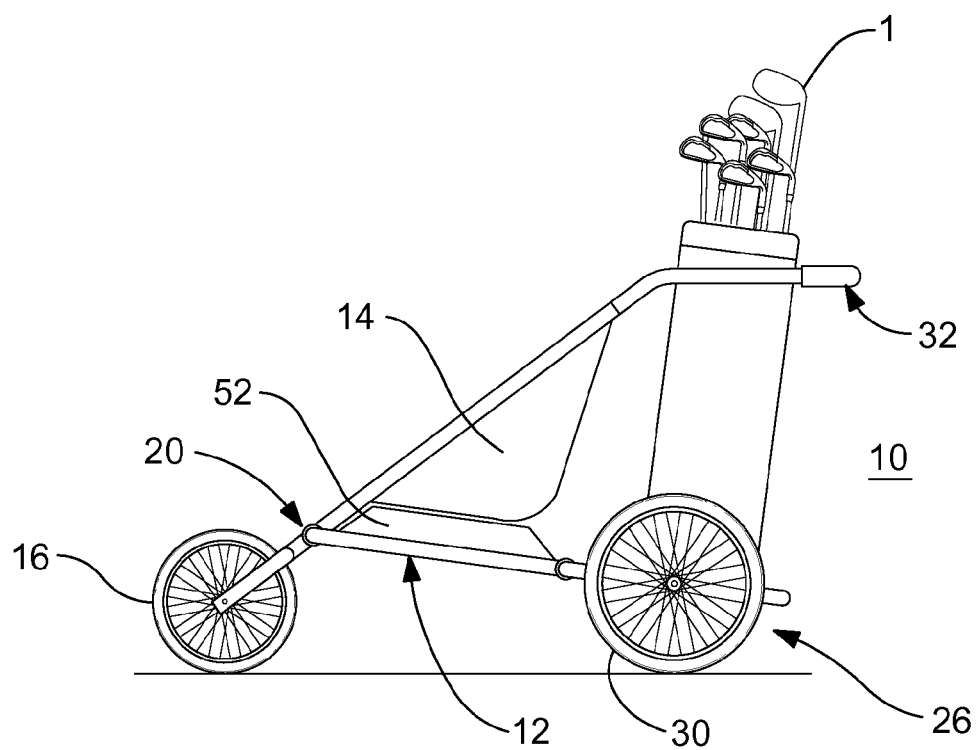
FIG. 1 is a side view of an infant stroller according to one or more embodiments disclosed herein.
Figure 2:
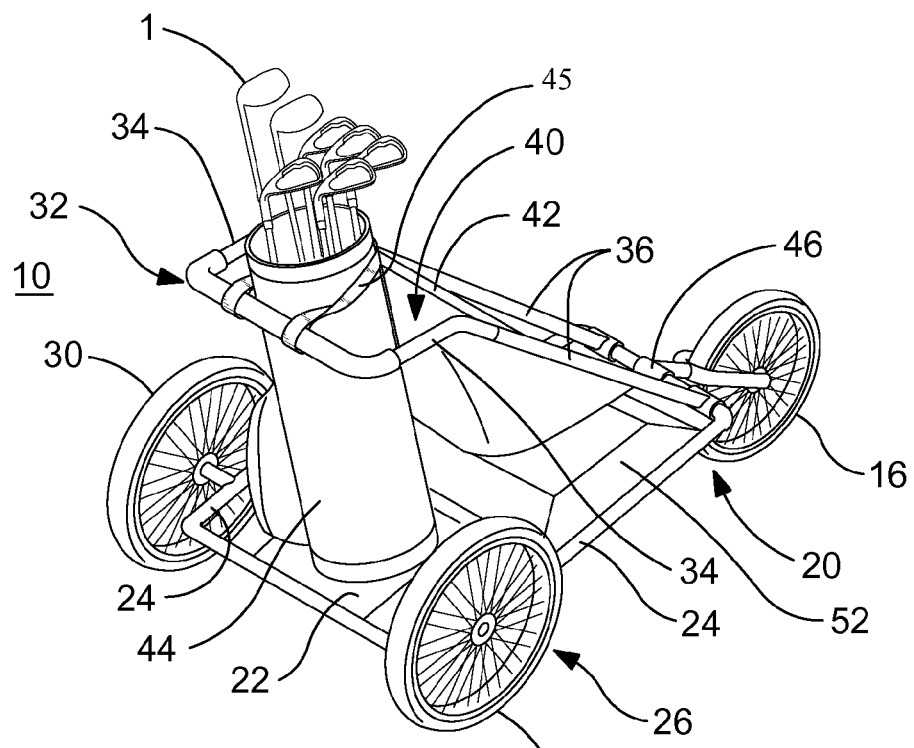
FIG. 2 is a rear-facing perspective view of an infant stroller according to one or more embodiments disclosed herein.

An infant stroller according to one or more embodiments disclosed herein is illustrated in FIG. 1 and FIG. 2 and generally designated 10. The infant stroller 10 includes a frame 12 having a frontward-facing seat 14. The seat 14 may be provided for receiving an infant. The seat 14 may be made from a canvas, fabric, or any appropriately configured material.

The infant stroller 10 may further include a first wheel assembly 16 at a frontward portion 20 of the frame 12 for transport of the stroller 10. Each of the wheel assemblies may include an axle and a wheel or tire assembly configured for rotatable movement thereabout. The tire assembly may include a pneumatic, rubber, or any other appropriately configured structure capable of being rotated. As illustrated, the infant stroller 10 includes one centrally-positioned front wheel assembly 16, though a pair of wheel assemblies could alternatively be used at the front portion 20.

The infant stroller 10 may include a support 22 at least partially spanning opposing frame members 24 of the frame 12 at a rearward portion 26 of the frame 12. The support 22 may be a base plate that interconnects the frame 12 and increases the rigidity thereof. A pair of wheel assembles 30 is carried about opposing positions of the rearward portion 26 of the frame 12. Wheel assemblies 30 may share many characteristics with the first wheel assembly 16.

The infant stroller 10 may further include a handle assembly 32 that may be detachable from the frame 12. The handle assembly 32 may be configured for detachability by being slidably received by frame 12. Alternatively, the handle assembly 32 may be configured for detachability from frame 12 by use of appropriately configured fasteners and the like. The handle assembly 32 may define spaced-apart handle portions 34 that are configured for interconnecting with spaced-apart frame members 36. An enclosure 40 may be defined by a cross-member 42 that spans the spaced-apart frame members 36, or, alternatively, by the spaced-apart handle portions 34 of the handle 12. The handle assembly 32 is shown in greater detail in FIG. 3 in which the handle assembly 32 is shown detached from the frame 12.

The infant stroller 10 may include an athletic article container 44. The container 44 may be configured for receiving an athletic article such as a golf club 1, tennis rack, bat, or similar. The container 44 may be carried on the support 22 and extend through the enclosure 40, thereby securing the container 44 within the enclosure 40. A strap 45 may be provided for wrapping around the container 44 and into engagement with the handle assembly 32 for maintaining the container 44 within the enclosure 40.

Additionally, a counterweight 52 may be provided at the frontward portion 20 of the frame 12. The counterweight 52 may define an opening therein for storage capabilities. In one or more embodiments, counterweight 52 may be a cooler or the like that is provided for storing refreshments. Alternatively, counterweight 52 may be a storage container for storing additional athletic articles and accessories. Counterweight 52 may be configured for being attached to frame members 24.

Figure 4:
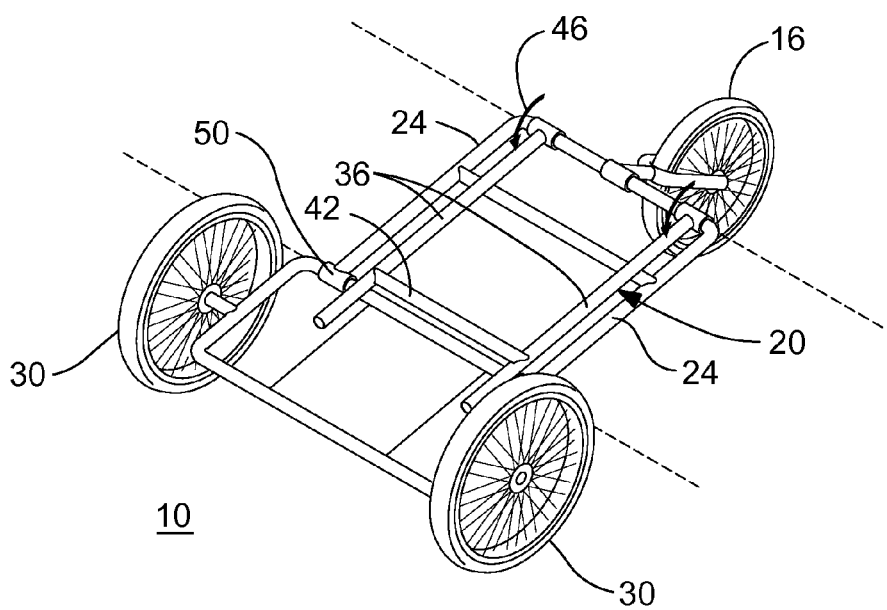
FIG. 4 is a rear-facing perspective view of an infant stroller in a collapsed position according to one or more embodiments disclosed herein.
Figure 5:
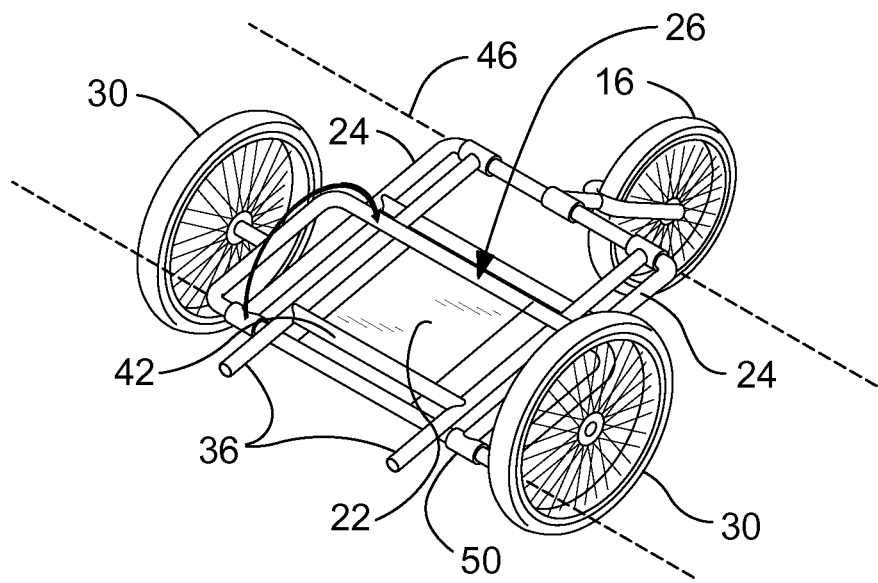
FIG. 5 is a rear-facing perspective view of an infant stroller in a collapsed position according to one or more embodiments disclosed herein.
Figure 6:
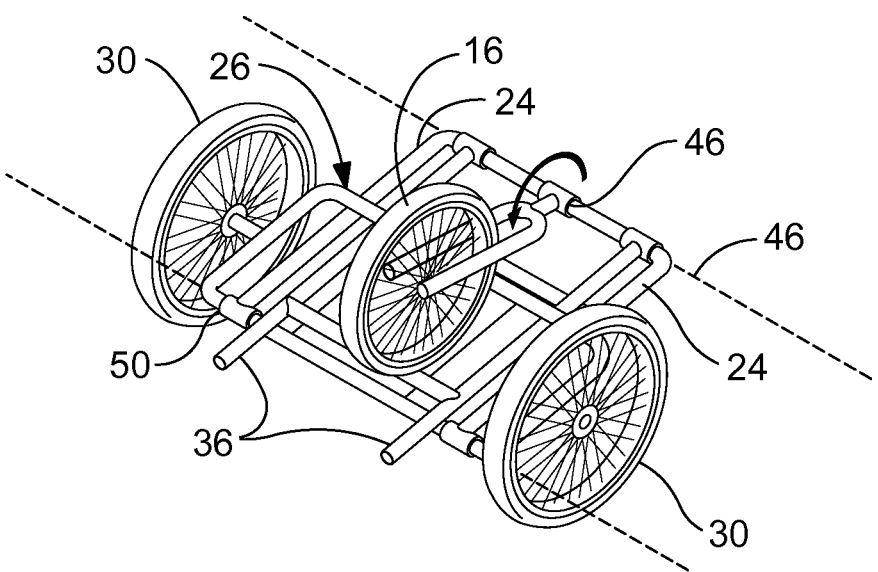
FIG. 6 is a rear-facing perspective view of an infant stroller in a collapsed position according to one or more embodiments disclosed herein.

As illustrated more closely in FIG. 4 and FIG. 6, the frontward portion 20 of the frame 12 defines a front pivot point 46 to which the first wheel assembly 16 pivots about such that the first wheel assembly 16 is pivotable rearwardly. As illustrated more closely in FIG. 5, the frame 12 may define a rear pivot point 50 spaced frontwardly of the support such that the pair of wheel assemblies 30 may be configured to pivot frontwardly.

Figure 3:
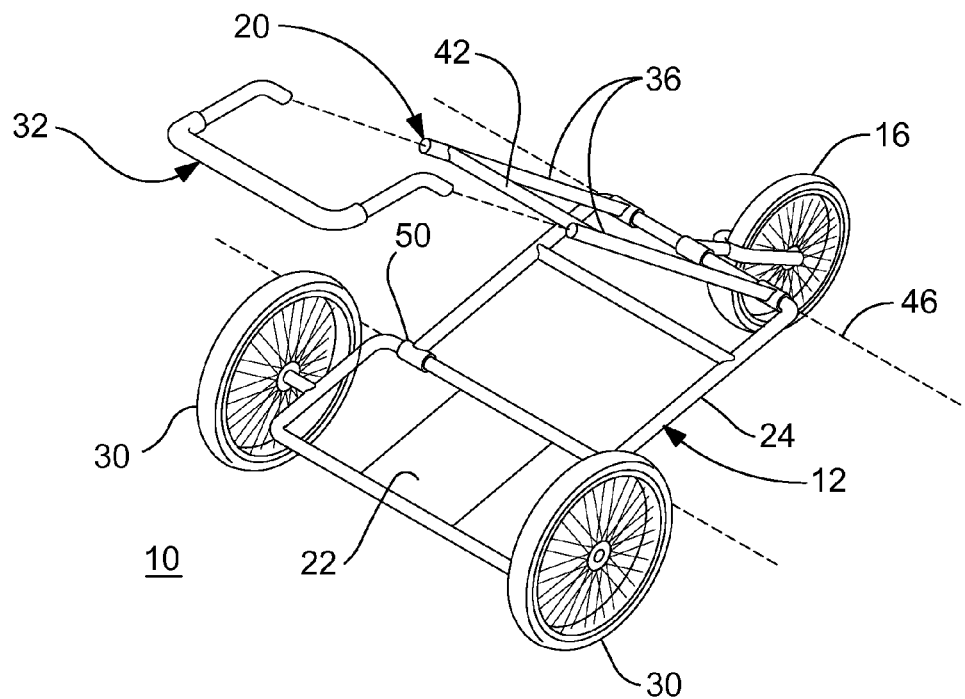
FIG. 3 is a rear-facing perspective view of an infant stroller in which a handle assembly is shown spaced-apart according to one or more embodiments disclosed herein.

The stroller assembly 10 is configured for being collapsible about the front pivot point 46 and rear pivot point 50. As illustrated in FIG. 3, the handle bar assembly 32 is removed from frame 12. Once removed, the handlebar assembly 32 and front portion 20 of frame 12 can be collapsed downward as illustrated in FIG. 4 by rotation of the front portion 20 about the pivot point 46. The stroller assembly 10 is further configured for being collapsible by rotation of the rear portion 26 of the frame about pivot point 50 as illustrated in FIG. 5. The front wheel assembly 16 is then pivotable about pivot point 46 to complete collapsing of the stroller assembly 10 as illustrated in FIG. 6

Figure 7:
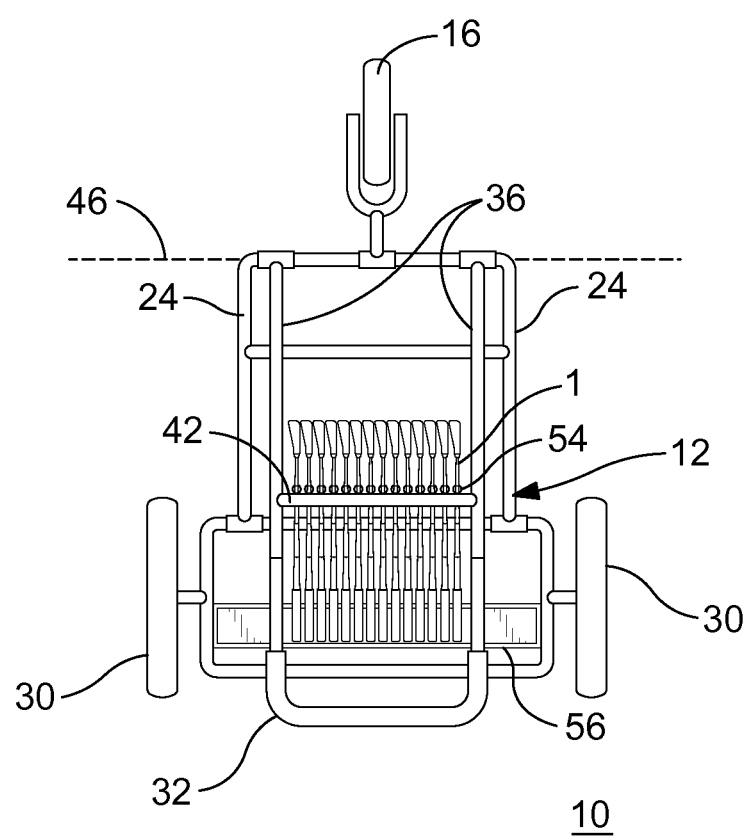
FIG. 7 is a top view of an infant stroller according to one or more embodiments disclosed herein.
Figure 8:
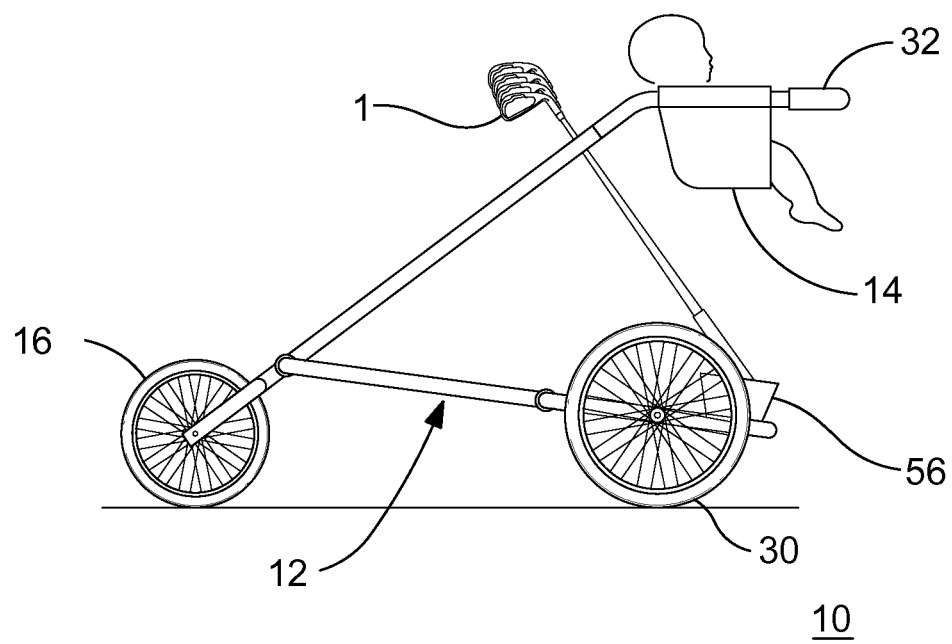
FIG. 8 is a side view of an infant stroller according to one or more embodiments disclosed herein.
Figure 9:
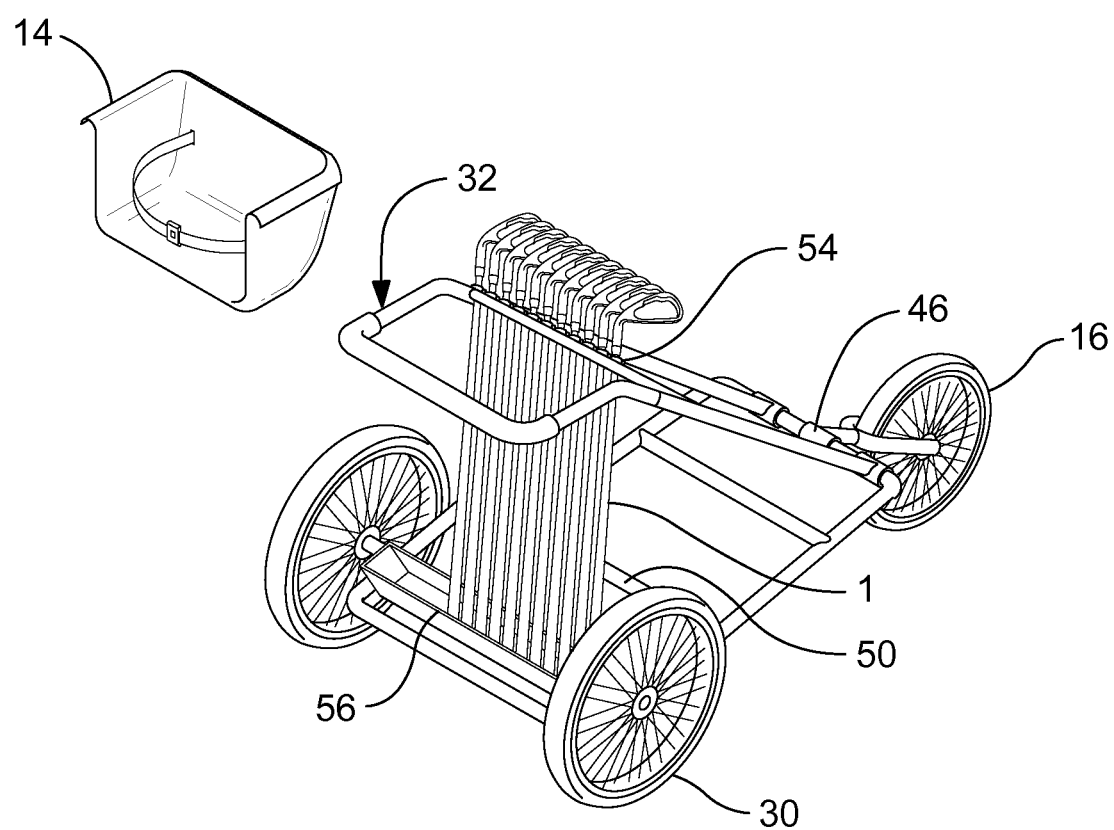
FIG. 9 is a rear-facing perspective view of an infant stroller according to one or more embodiments disclosed herein.

An alternate embodiment of infant stroller 10 is illustrated in FIGS. 7 through 9 in which like-referenced elements are represented by like-referenced character numbers. As illustrated, cross-member 42 defines one or more spring clip assemblies 54 that are configured for receiving an elongate shaft of the athletic article, in this example, illustrated as a golf club 1. The spring clip assemblies 54 may be u-shaped clips made of a resilient material such as metal that are configured for resiliently engaging the shaft of a golf club 1. A basket assembly 56 is provided that spans a rear portion of the frame 12 and is configured for receiving one end of the golf club 1. The seat 14 is carried by the handle assembly 32 such that the seat 14 is rear-facing. The one or more embodiments illustrated in FIG. 8 and FIG. 9 are collapsible in the same manner as the one or more embodiments of stroller 10 illustrated in FIGS. 1 through 7.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:
1. An infant stroller, comprising:
a frame having a seat for receiving an infant and a first wheel assembly at a frontward portion thereof for transport of the stroller;
a support at a rearward portion thereof of the frame;
a pair of wheel assemblies carried about opposing positions of the rearward portion of the frame;

a handle assembly detachable from the frame and defining spaced-apart handle portions that are configured for interconnecting with spaced-apart frame members;

an enclosure area defined by a cross-member that spans the spaced-apart frame members and by the spaced-apart handle portions of the handle; and an athletic article container carried on the support and extending through the enclosure area, wherein the frame defines a rear pivot point spaced frontwardly of the support such that the pair of wheel assemblies is pivotable frontwardly.

2. The infant stroller of claim 1, wherein the frontward portion of the frame defines a front pivot point to which the first wheel assembly pivots about such that the first wheel assembly is pivotable rearwardly.

3. The infant stroller of claim 1, wherein the cross-member defines at least one u-shaped clip configured for receiving an elongate shaft of an athletic article.

4. The infant stroller of claim 3, further including a basket about the support for receiving an end of the elongate shaft.

5. The infant stroller of claim 1, further including a counterweight at the front portion of the frame for retarding rearward pivoting forces about the pair of wheel assemblies.

6. The infant stroller of claim 5, wherein the counterweight is a cooler.

7. The infant stroller of claim 1, wherein the frontward portion of the frame defines a front pivot point to which the first wheel assembly pivots about such that the first wheel assembly is pivotable rearwardly, and wherein the frame is foldable between a folded position and an unfolded position.

8. The stroller according to claim 1, wherein the athletic article is a golf club.

9. An infant stroller, comprising:

a frame carrying a seat for receiving an infant;

a first wheel assembly at a frontward portion of the frame for transport of the stroller;

a support at a rearward portion of the frame;

a pair of wheel assembles carried about opposing positions of the rearward portion of the frame;

a handle assembly detachable from the frame and defining spaced-apart handle portions that are configured for interconnecting with spaced-apart frame members;

a cross-member that spans the spaced-apart frame members and carries one or more golf club engaging members configured for engageably receiving an elongate shaft of a golf club; and a basket assembly carried about a rearward portion of the frame and configured for receiving an end of the golf club, wherein the frame defines a rear pivot point spaced frontwardly of the support such that the pair of wheel assemblies is pivotable frontwardly.

10. The infant stroller of claim 9, wherein the frontward portion of the frame defines a front pivot point to which the first wheel assembly pivots about such that the first wheel assembly is pivotable rearwardly.

11. The infant stroller of claim 9, further including a counterweight at the front portion of the frame for retarding rearward pivoting forces about the pair of wheel assemblies.

12. The infant stroller of claim 11, wherein the counterweight is a cooler.

13. The infant stroller of claim 9, wherein the frontward portion of the frame defines a front pivot point to which the first wheel assembly pivots about such that the first wheel assembly is pivotable rearwardly, and wherein the frame is foldable between a folded position and an unfolded position.

14. The stroller according to claim 9, wherein the seat is rear-facing.

15. An infant stroller comprising:

a frame having a front wheel assembly and a rear wheel assembly;

a handlebar assembly selectively separable from the frame and extending from the frame and pivotable about a front pivot line defined about the frame, the handlebar assembly defining an enclosure area between opposing members of the handlebar assembly, a handle grip of the handlebar assembly, and a cross member of the frame;

a support at a rear portion of the frame; and an athletic article carried on the support and extending through the enclosure area, wherein the handlebar assembly and front wheel assembly each pivot about the front pivot line but are separately pivotable thereabout, wherein the frame defines a rear pivot point spaced frontwardly of the support such that the rear wheel assembly is pivotable frontwardly.

* * * * *